US010172364B2

(12) United States Patent
Maningat et al.

(10) Patent No.: US 10,172,364 B2
(45) Date of Patent: Jan. 8, 2019

(54) WHEAT PROTEIN-BASED DOUGH RELAXER COMPOSITIONS AND METHODS OF PRODUCING THE SAME

(71) Applicant: Manildra Milling Corporation, Shawnee Mission, KS (US)

(72) Inventors: Clodualdo C. Maningat, Platte City, MO (US); Neal D. Bassi, Overland Park, KS (US)

(73) Assignee: Manildra Milling Corporation, Shawnee Mission, KS (US)

(*) Notice: Subject to any disclaimer, the term of this patent is extended or adjusted under 35 U.S.C. 154(b) by 0 days.

(21) Appl. No.: 15/088,256

(22) Filed: Apr. 1, 2016

(65) Prior Publication Data
US 2017/0006880 A1 Jan. 12, 2017

Related U.S. Application Data

(60) Provisional application No. 62/191,074, filed on Jul. 10, 2015, provisional application No. 62/246,706, filed on Oct. 27, 2015.

(51) Int. Cl.
*A21D 2/38* (2006.01)
*A21D 2/26* (2006.01)
*A21D 10/00* (2006.01)

(52) U.S. Cl.
CPC ............ *A21D 2/265* (2013.01); *A21D 2/267* (2013.01); *A21D 10/005* (2013.01)

(58) Field of Classification Search
CPC .................................. A21D 2/38; A21D 8/047
See application file for complete search history.

(56) References Cited

U.S. PATENT DOCUMENTS

| 2,368,384 A * | 1/1945 | Selman, Jr. ............ C12N 1/063 |
| | | 426/60 |
| 4,198,438 A | 4/1980 | Singer et al. |
| 4,664,932 A | 4/1987 | Yamaguchi et al. |
| | | (Continued) |

FOREIGN PATENT DOCUMENTS

| EP | 0188318 | 7/1986 |
| EP | 0242885 | 8/1991 |
| | (Continued) | |

OTHER PUBLICATIONS

Lim et al. (KR 2006022619) Derwent abstract Mar. 10, 2006 1 page.*

(Continued)

*Primary Examiner* — Felicia C Turner
(74) *Attorney, Agent, or Firm* — Hovey Williams LLP

(57) ABSTRACT

Wheat protein-based dough relaxers are prepared by pre-reacting a high-concentration wheat protein product (e.g., vital wheat gluten, wheat protein isolate, and mixtures thereof) with a yeast product selected from inactivated non-leavening yeast, yeast extract, and mixtures thereof. The pre-reaction is preferably carried out using an aqueous slurry containing the protein and yeast products, followed by drying. The resultant dough relaxers may be incorporated into a wide variety of wheat protein-based dough formulations to enhance the handling properties thereof, especially dough extensibility and machinability, and reduced dough mixing times.

24 Claims, 6 Drawing Sheets

(56) References Cited

U.S. PATENT DOCUMENTS

| | | | | |
|---|---|---|---|---|
| 2006/0008567 A1* | 1/2006 | Elmusa | ................... | A21D 2/16 |
| | | | | 426/549 |
| 2008/0254200 A1 | 10/2008 | Bassi et al. | | |
| 2013/0059031 A1* | 3/2013 | Else | ...................... | A21D 8/042 |
| | | | | 426/20 |

FOREIGN PATENT DOCUMENTS

| | | | | |
|---|---|---|---|---|
| GB | 695145 | * | 8/1953 | .............. A23J 1/125 |
| GB | 721057 | * | 12/1954 | .............. A23J 1/125 |
| WO | 2015-089785 | | 6/2015 | |

OTHER PUBLICATIONS

The International Search Report and Opinion dated Oct. 10, 2016, in PCT/US2016/041088, filed Jul. 6, 2016.

* cited by examiner

WHEAT PROTEIN-BASED DOUGH RELAXER COMPOSITIONS AND METHODS OF PRODUCING THE SAME

RELATED APPLICATIONS

This application claims the benefit of U.S. Provisional Patent Application No. 62/191,074, filed Jul. 10, 2015 and U.S. Provisional Patent Application No. 62/246,706 filed Oct. 27, 2015, both of which are incorporated by reference herein in their entireties.

BACKGROUND OF THE INVENTION

Field of the Invention

The present invention is broadly concerned with dough relaxers made up of natural ingredients, as well as methods of use thereof and resultant dough formulations. More particularly, the invention is concerned with dough relaxers produced by pre-treating or pre-reacting wheat protein with non-leavening yeast and/or yeast extract; such relaxers may then be used in conventional dough formulations to obtain desirable relaxation properties.

Description of the Prior Art

It is known that redox (reduction-oxidation) reactions involving wheat flour sulfhydryl (SH) groups and disulfide bonds have a significant effect on structure of gluten proteins, and are considered crucial to dough rheology and bread-making performance (Fitchett and Frazier 1986; Grosch 1986). In the past, dough relaxers or reducing agents have been added to wheat-based doughs to improve the extensibility, sheeting properties, and overall machinability of the doughs. In flour tortillas, for example, reducing agents are commonly used to shorten resting times before pressing by increasing the extensibility and decreasing elasticity of gluten proteins within the tortilla doughs. This is achieved using compounds such as L-cysteine, sodium metabisulfite, sorbic acid or fumaric acid, which break disulfide bonds (Van Eijk and Legel 1996). While L-cysteine is quite effective, it is derived from animal sources (hair or feathers). Sodium metabisulfite is also chemically derived and is considered an allergen.

The resistance of consumers to chemical additives and their propensity to desire more natural additives is growing. Therefore, commercial suppliers of wheat-based products would like to be able to offer "natural" additives to meet consumer preferences.

Heretofore, materials such as soy flour, wheat germ, garlic, and inactivated dry yeast have been proposed as dough relaxing agents or mix time reducers, because they are a good source of low molecular weight SH compounds such as L-cysteine and/or glutathione. However, these materials are not as effective as animal-derived or synthetic chemical relaxers. There is therefore a need in the art for improved dough relaxers which are fully effective while avoiding the use of traditional dough relaxing ingredients.

The following references describe the prior research on wheat proteins, dough relaxers, and dough formulations containing conventional relaxers: U.S. Pat. Nos. 4,643,900; 5,510,126, 5,576,036; 5,763,741; 5,792,499; 5,859,315; 6,436,459; and 8,309,152; US Patent Applications Nos. 2004/0146601; 2008/0254200; PCT Publication Nos. WO 2006009447 A1 and WO 2013092731 A1. Cha, J.-Y., Park, J.-C., Jeon, B.-S., Lee, Y.-C. and Cho, Y.-S. 2004. Optimal fermentation conditions for enhanced glutathione production by *Saccharomyces cerevisiae* FF-8. J. Microbiol. 42(1): 51-55. Chen, X. and Schofield, J. D. 1996. Changes in glutathione content and bread-making performance of white wheat flour during short-term storage. Cereal Chem. 73(1): 1-4. Fitchett, C.S. and Frazier, P.J. 1986. Action of oxidants and other improvers. Pages 179-198 In: Chemistry and Physics of Baking, J. M. V. Blanshard, P. J. Frazier and T. Galliard, eds., Royal Society of Chemistry: London. Frater, R. and Hird, F. J. R. 1963. The reaction of glutathione with serum albumin, gluten and flour proteins. Biochem. J. 88:100-105. Grosch, W. 1986. Redox systems in dough. Pages 155-169 In: Chemistry and Physics of Baking. J. M. V. Blanshard, P.J. Frazier and T. Galliard, eds., Royal Society of Chemistry: London. Sakato, K. and Tanaka, H. 1992. Advanced control of glutathione fermentation process. Biotechnol. Bioeng. 40:904-912. Wei, G., Li, Y., and Chen, J. 2003a. Effect of surfactants on extracellular accumulation of glutathione by *Saccharomyces cerevisieae*. Process Biochem. 38:1133-1138. Wei, G., Li, Y., and Chen, J. 2003b. Application of a two-stage temperature control strategy for enhanced glutathione production in the batch fermentation by *Candida utilis*. Biotechnol. Lett. 25:887-890.

SUMMARY OF THE INVENTION

The present invention overcomes the problems outlined above and provides a new class of dough relaxers which comprise high-concentration wheat protein products pre-reacted with non-leavening yeasts and/or yeast extracts. These dough relaxers can then be used in a wide variety of dough formulations to give the formulations beneficial properties, particularly in the context of commercial processing. As used herein, "dough relaxers" refers to compositions having the ability to improve at least one of the extensibility, sheeting, machinability, and lowered mixing time properties of doughs prior to baking or frying thereof; dough relaxers are not associated with end properties of such baked or fried products derived from the doughs, e.g., bread loaf volumes or cookie spreads.

In more detail, the highly concentrated wheat protein products used in the invention are advantageously selected from the group consisting of products containing at least about 50% by weight gluten proteins. Such products are typically produced by wet-processing of wheat flour to remove a substantial fraction of the native starch of the flour. Two types of commercially available products are particularly useful, namely vital wheat glutens and wheat protein isolates. Vital wheat glutens usually contain about 75% by weight protein (dry basis) and are classified as wheat protein concentrates. Further processing of these products, either by mechanical means or solubilization followed by centrifugation or filtration, yields products having protein levels of around 85-90% by weight (dry basis), using a nitrogen conversion factor of 6.25. These products are normally referred to in the art as wheat protein isolates.

The non-leavening or inactivated yeasts, as well as the yeast extracts, include naturally occurring glutathione, a tripeptide composed of glutamic acid, cysteine, and glycine (γ-L-glutamyl-L-cysteinylglycine) having CAS# 70-18-8. Preferably, these yeasts contain from about 10-30 mg glutathione per gram of yeast The high-protein products are advantageously pre-reacted with non-leavening yeasts and/or yeast extracts in aqueous slurries with agitation and mild heating. Such slurries generally include from about 20-85% by weight water (more preferably from about 40-75% by weight, and most preferably from about 55-70% by weight), from about 15-60% by weight high-concentration gluten product(s) (more preferably from about 25-50% by weight and most preferably from about 28-40% by weight), and from about 0.01-20% by weight of suitable yeast product(s) (more preferably from about 1-10% by weight, and most preferably from about 1-5% by weight). The foregoing ranges are based upon the total weight of the slurries taken as 100% by weight. The weight ratio of high-concentration gluten products: yeast in the slurries (and thus also in the final dough relaxers) is usually from about 10:1 to 100:1, more preferably from about 35:1 to 70:1.

The slurries are preferably agitated in a water bath for a period of from about 30 minutes-2 hours, more preferably from about 45 minutes-1.5 hours, and most preferably about 1 hour. The water fraction of the slurries is normally heated to a level of from about 90-140° F., more preferably from about 100-130° F., and most preferably around 122° F. and the water bath temperature is normally kept from about 90-140° F., more preferably from about 100-130° F., and most preferably around 122° F.

In another embodiment of the invention, the high-protein products are pre-reacted with non-leavening yeasts and/or yeast extracts in dough states under static conditions and with mild heating. The doughs are preferably agitated for a period of from about 30 seconds-5 minutes, more preferably from about 60 seconds-3 minutes, and most preferably about 90 seconds. The water fraction of the doughs is normally heated to a level of from about 80-125° F., more preferably from about 95-110° F., and most preferably around 104° F. The moist doughs are allowed to sit in a static condition for a period of from about 30 minutes-3 hours, more preferably from about 45 minutes-2 hours, and most preferably about 1 hour.

After such pre-treatments, the moist doughs or slurries may be dried by any convenient means to form solids. In preferred forms, the moist doughs or slurries are placed in a deep freezer for at least about 24 hours whereupon the frozen product may be dried in a freeze dryer followed by grinding to create a particulate material, e.g., a powder.

The pre-reacted dough relaxers in powder form can be added to wheat flour-based doughs, which can be baked or fried to yield a wide variety of end products. The dough relaxers are generally added to wheat flour at a level of from about 0.1-10% by weight (more preferably from about 0.5-8% by weight, and most preferably from about 1-5% by weight), based upon the total weight of the mixture taken as 100% by weight. The relaxers may be incorporated by any convenient means. Inasmuch as the preferred relaxers are dried, particulate form, they can be readily added with the other dough ingredients without difficulty.

DETAILED DESCRIPTION OF THE PREFERRED EMBODIMENT

Examples 1-9

Figure 1:
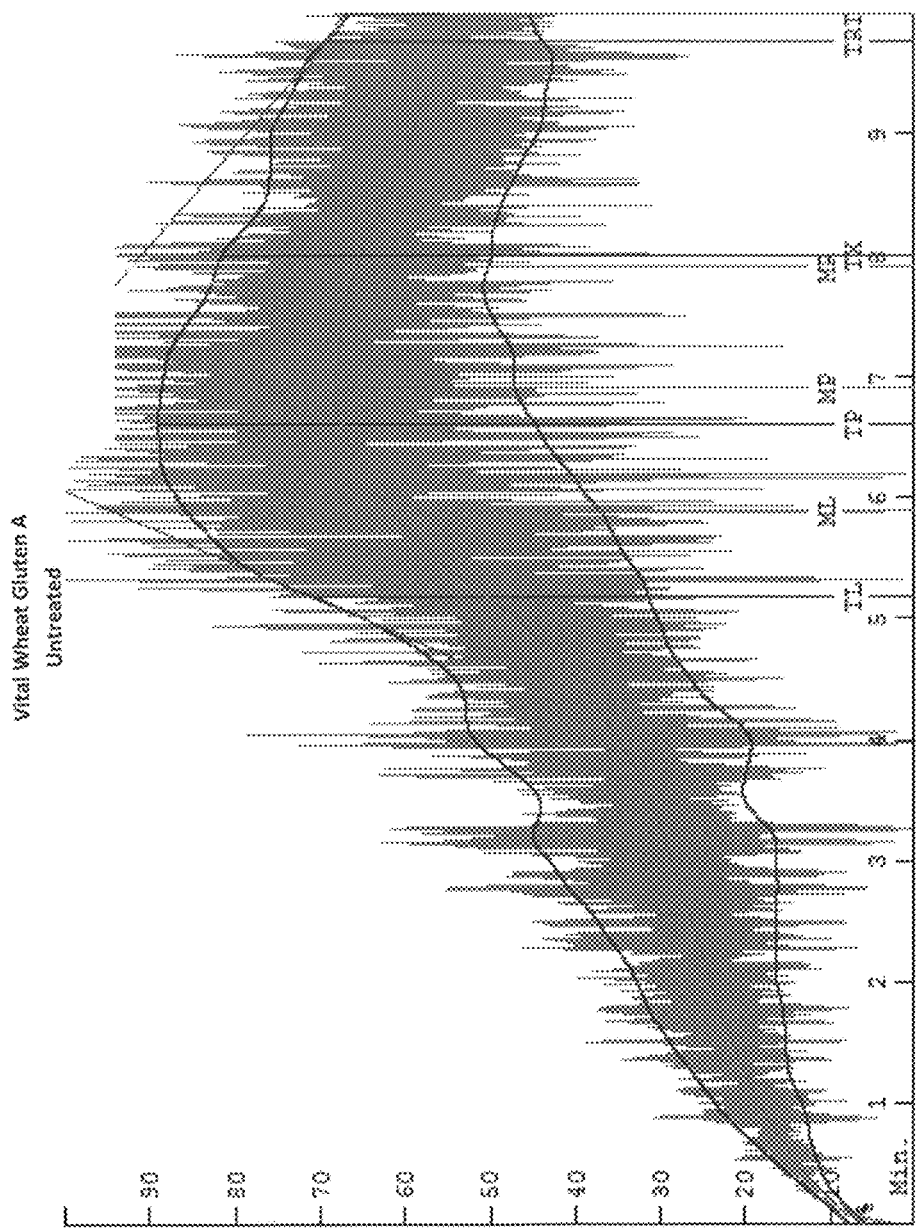
FIG. 1 is a mixograph profile of one treated vital wheat gluten A at 85.7% absorption.
Figure 2:
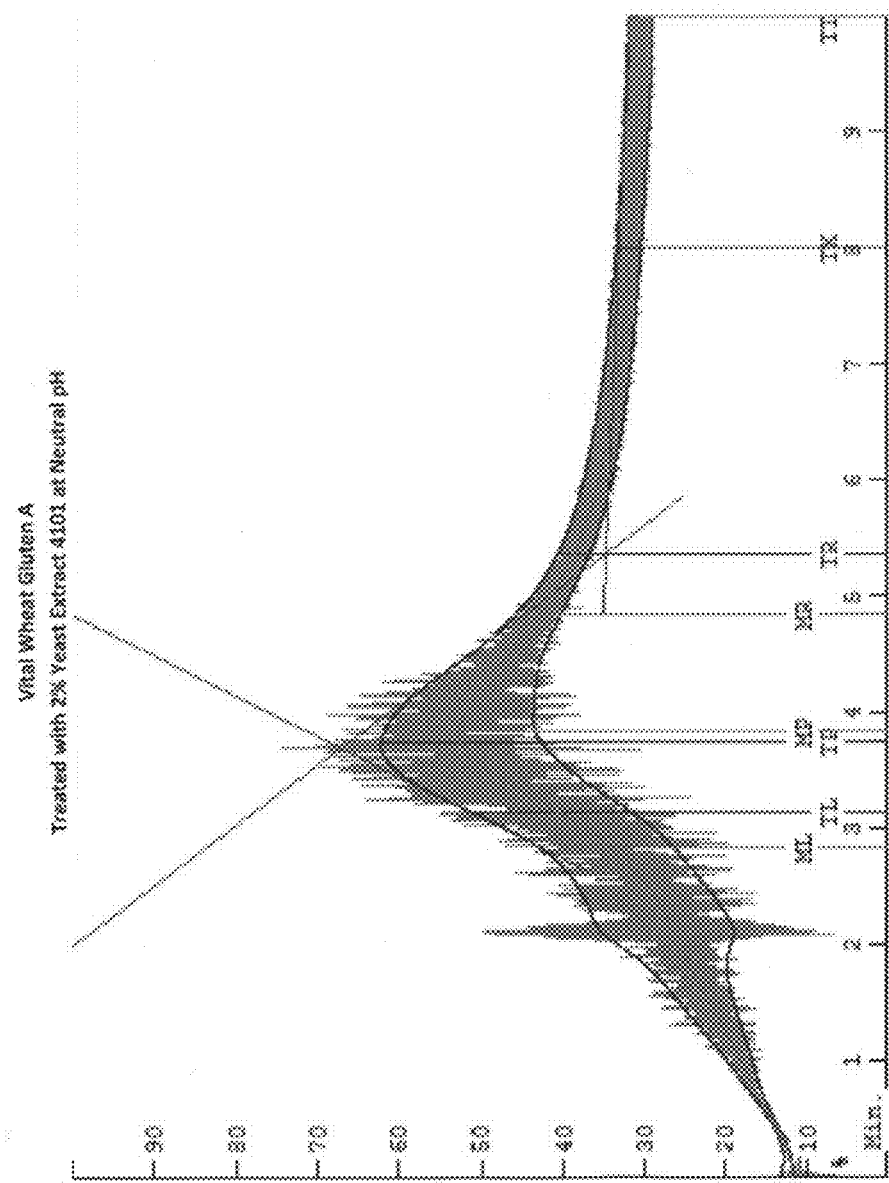
FIG. 2 is a mixograph profile at 85.7% absorption of vital wheat gluten A treated with 2% yeast extract 4101 at neutral pH.

The following examples set forth techniques for the preparation of representative dough relaxers of the invention, and the effect thereof on dough formulations. It is to be understood, however, that these examples are provided by way of illustration only, and nothing therein should be taken as a limitation upon the overall scope of the invention.

Materials

Five wheat protein samples were used in this series, of tests, namely Vital Wheat Gluten (Lot N070614), Vital Wheat Gluten (Lot N070414), Vital Wheat Gluten (Lot H082714), Wheat Protein Isolate (Lot N082714) and Wheat Protein Isolate (Lot H120214). These products were all manufactured by Manildra Milling Corporation (Bomaderry, NSW, Australia and Hamburg, Iowa) and will be referred to herein as Vital Wheat Gluten A, Vital Wheat Gluten B, Vital Wheat Gluten C, Wheat Protein Isolate D and Wheat Protein Isolate E, respectively. All wheat protein samples were sent to Medallion Laboratories (Plymouth, Minn.) for analysis of moisture and protein.

The non-leavening yeasts or yeast extracts used in this series of tests were: 1. Springer® 4101/0-PW-L, a yeast extract produced by controlled autolysis process by Bio Springer (a Lesaffre Company) in Cedar Rapids, Iowa, 2. SAF Pro® Relax RS 190, a deactivated (non-leavening) yeast (*Saccharomyces cerevisiae*) produced by Lesaffre Yeast Corporation (Milwaukee, Wis.) and 3. Fermaid® SuperRelax, produced by fermenting a specific baker's yeast strain (*Saccharomyces cerevisiae*), followed by drying and deactivation by Lallemand Baking Solutions (Montreal, Quebec, Canada). For convenience, these yeast products will be referred to herein as 4101, RS 190 and SuperRelax, respectively. The following glutathione content of the yeast products was provided by the respective manufacturers. SuperRelax contains 15-19 milligrams glutathione per gram (or 1.5-1.9%) and 4101 contains 1.0-3.0% glutathione.

All chemicals used were either reagent grade or commercial grade. Citric acid (anhydrous) and lactic acid (88%) were obtained from ADM (Decatur, Ill.), DL-malic acid (FCC) was obtained from Bartek Ingredients (Stoney Creek, Ontario, Canada), and tartaric acid (USP/FCC) was obtained from American Tartaric Products, Inc. (Windsor, Calif.). Glacial acetic acid (USP) was obtained from Spectrum Chemical Mfg. Corp. (Gardena, Calif.).

Methods

Mixograph Procedure A

Ten grams of wheat protein treated with non-leavening yeast or yeast extract was added to 25 grams of native wheat starch (GemStar™ 200 Wheat Starch, Manildra Milling Corporation, Hamburg, Iowa) followed by blending into a homogeneous mixture. The mixture was transferred into the 35-gram bowl of the Mixograph (National Manufacturing Company, Lincoln, Neb.) and 30 grams of water was added. The Mixograph instrument was turned on immediately and allowed to run for 10 minutes. After 10 minutes, the parameters in the Mixograph curve generated using MIX-SMART® for Windows for computerized data acquisition and analysis were recorded using mid-line analysis: peak time (min), peak height (%), peak width (%), mixing stability or tolerance (%/min) and work input (% torque x min). Peak time represents the time for the curve to reach a peak. Peak height signifies the maximum mixing resistance. The sum of the absolute values for the left of peak and right of peak slopes is a measure of mixing stability or tolerance. A small value indicates a flat, stable curve, which is desirable. A large value indicates a rapid rise and/or breakdown, which is undesirable. Work input represents the work put into the flour and water dough in order to develop it, and is calculated as the integral value of the area beneath the mid-line from time zero to the peak time. Peak width at mid-line is calculated by subtracting the height of the bottom envelope from the height of the top envelope or in other words it represents the distance between the top and bottom envelopes.

Mixograph Procedure B

In order to evaluate the rheological effect on wheat flour, pre-reacted dough relaxers in accordance with the invention were added at 2% or 4% levels to hard red winter wheat flour (Bay State Milling Company, Mooresville, N.C.). The Certificate of Analysis for this wheat flour showed the following analysis results: moisture, 13.7%; protein, 11.5%; ash, 0.5%; and Falling Number, 390. The water absorption of the flour by itself is 63% as determined in the Mixograph. The mixing properties of the blended flour were examined in a Mixograph instrument by weighing 35 grams of the flour and adding to it 23.05 grams of water plus extra water to compensate for the presence of wheat proteins (1.5 or 2 grams of water for every gram of wheat protein added). Mid-line Mixograph parameters were recorded as described above in Procedure A.

Example 1

Vital Wheat Gluten A was treated with 2-3% of non-leavening yeast or yeast extract in a hydrated dough state for 1 hour at room temperature and the gluten dough was subsequently frozen. The frozen dough was then dried in a freeze-drier and ground into a powder. Specifically, 1.8 grams of yeast extract (4101) was dispersed with stirring in 180 ml of tap water (104° F.) and then added to a 500-ml plastic container containing 90 grams of Vital Wheat Gluten A. The lid was placed on the container and then shaken violently by hand for immediate hydration and formation of dough. The dough was allowed to remain in static condition for 1 hour after which it was placed in a deep freezer for at least 24 hours. The frozen dough of gluten was shipped overnight to the Food Processing Center of the University of Nebraska, Lincoln where it was dried in a ThermoVac freeze-drier and then ground into a powder using a Thomas Wiley mini-mill.

Example 2

The procedure of Example 1 was repeated using 2.7 grams of yeast extract (4101) instead of 1.8 grams of yeast extract (4101).

Example 3

The procedure of Example 1 was repeated using 2.7 grams of non-leavening yeast (SuperRelax) instead of 1.8 grams of yeast extract (4101).

Example 4

The procedure of Example 1 was repeated using 2.7 grams of non-leavening yeast (RS 190) instead of 1.8 grams of yeast extract (4101).

Example 5

In order to evaluate the effect of lower pH, the procedure of Example 1 was modified using natural acidulants to acidify the slurry. A mixture of 510 grams of tap water (122° F.) was added to a 1-liter beaker along with 2.7 grams of acetic acid, followed by slow addition of 90 grams of Vital Wheat Gluten A. Then, 2.7 grams of yeast extract (4101) was added to the mixture and the resulting slurry was stirred for 1 hour, with the beaker placed in a water bath maintained at 122° F. After 1 hour, the beaker containing the slurry was removed from the water bath and allowed to cool to room temperature. The slurry was placed in a deep freezer for at least 24 hours and then freeze-dried and ground into a powder at University of Nebraska as described in Example 1.

Example 6

This procedure is a repeat of Example 5 except the treatment used 3% non-leavening yeast (SuperRelax) and 3% of other natural acidulants (for example citric acid, malic acid, lactic acid or tartaric acid).

Example 7

In order to evaluate the effect of other wheat protein sources, the procedure of Example 5 was repeated using 2% 4101 and 3% lactic acid.

Example 8

The above procedure of Example 7 was repeated using 3% RS 190 instead of 2% 4101.

Example 9

Wheat Protein Isolate D and Wheat Protein Isolate E were compared by treating with 3% RS 190 using three different natural acidulants (malic, citric or tartaric acid) to acidify the slurry.

The pH levels of 10% aqueous slurry in distilled water of untreated and yeast-treated wheat protein samples was measured.

The mixing properties of the above samples from Examples 1-9 were measured in a Mixograph using Procedure A.

Selected samples of the pre-reacted dough relaxers prepared in Examples 1-9 were evaluated for their effects on rheology of hard red winter wheat flour (Bay State Milling Company, Mooresville, North Carolina). The level of addition to wheat flour is 2-4% and the Mixograph characteristics were measured at two levels of water absorption using Procedure B.

Results

The moisture, protein, pH and mixing properties of five wheat protein samples used in this invention are shown in Table 1. Moisture varies from 4.3-6.3% and pH ranges from 5.30-5.89. The three vital wheat gluten samples with 75.6-76.0% protein exhibited varying properties with both Vital Wheat Gluten A and B possessing higher mixing strength (elevated peak height) and higher work input compared to Vital Wheat Gluten C. In contrast, Vital Wheat Gluten C demonstrated a longer mixing time but increased mixing stability or tolerance compared to the other wheat gluten samples. Wheat Protein Isolate D (89.0% protein) displayed a higher mixing strength and higher work input compared to Wheat Protein Isolate E (97.3% protein).

TABLE 1

Properties of Wheat Proteins Used as Base Materials for Treatment with Non-Leavening Yeast or Yeast Extract

| Parameters | Vital Wheat Gluten A | Vital Wheat Gluten B | Vital Wheat Gluten C | Wheat Protein Isolate D | Wheat Protein Isolate E |
|---|---|---|---|---|---|
| Moisture, % | 6.1 | 6.2 | 4.4 | 6.3 | 4.3 |
| Protein, % d.b. | 76.0[a] | 75.6[a] | 75.6[a] | 89.0[b] | 97.3[b] |
| pH | 5.70 | 5.66 | 5.64 | 5.30 | 5.89 |
| Peak Time, min | 6.9 | 6.4 | 10.0 | 9.7 | 9.9 |
| Peak Height, % | 68.6 | 61.2 | 17.8 | 65.4 | 32.9 |
| Peak Width, % | 41.6 | 36.9 | 5.6 | 45.4 | 41.6 |
| Mixing Stability or Tolerance, %/min | 6.1 | 10.0 | 0.5 | 4.1 | 2.4 |
| Work Input, % torque × min | 249.2 | 209.0 | 153.4 | 323.0 | 243.3 |

[a]Calculated as N × 5.7, dry basis
[b]Calculated as N × 6.25, dry basis

The appearance of the Mixograph curves of untreated and yeast-treated Vital Wheat Gluten A is shown in FIGS. 1-5. The Mixograph data in Table 2 generally shows that the parameters of peak time, peak height, peak width, work input and mixing stability or tolerance decreased as a result of treating wheat gluten with 2-3% non-leavening yeast or yeast extract. Treatment with 3% yeast extract (4101) exhibited the largest lowering effect of those five parameters whereas 3% SuperRelax showed the smallest lowering effect. These results can possibly be explained by the level of glutathione in the yeast samples. Glutathione is a reducing agent capable of cleaving disulfide bonds in the wheat protein polymer, which consequently results in the observed Mixograph data. In the hydrated state, the gluten dough treated with 2-3% non-leavening yeast or yeast extract yielded more extensible, less elastic doughs compared to the untreated wheat gluten, with 4101 treatment showing the most extensible property. Overall, these reduced forms of wheat proteins display varying levels of dough extensibility depending on the level and type of yeast product used.

TABLE 2

Mixing Properties of Vital Wheat Gluten A after Treatment with Non-Leavening Yeast or Yeast Extract

| | Level of Non-Leavening Yeast or Yeast Extract, % | | | |
|---|---|---|---|---|
| Parameters | 0 | 2% 4101 | 3% 4101 | 3% RS 190 | 3% SuperRelax |
| pH | 5.70 | 5.98 | 5.91 | 5.77 | 5.71 |
| Peak Time, min | 6.9 | 3.8 | 3.2 | 5.9 | 6.5 |
| Peak Height, % | 68.6 | 52.6 | 45.2 | 56.2 | 55.8 |
| Peak Width, % | 41.6 | 18.2 | 14.8 | 27.8 | 25.2 |
| Mixing Stability or Tolerance, %/min | 6.1 | 7.2 | 8.1 | 13.2 | 11.4 |
| Work Input, % torque × min | 249.2 | 106.3 | 85.1 | 170.2 | 189.1 |

Figure 3:
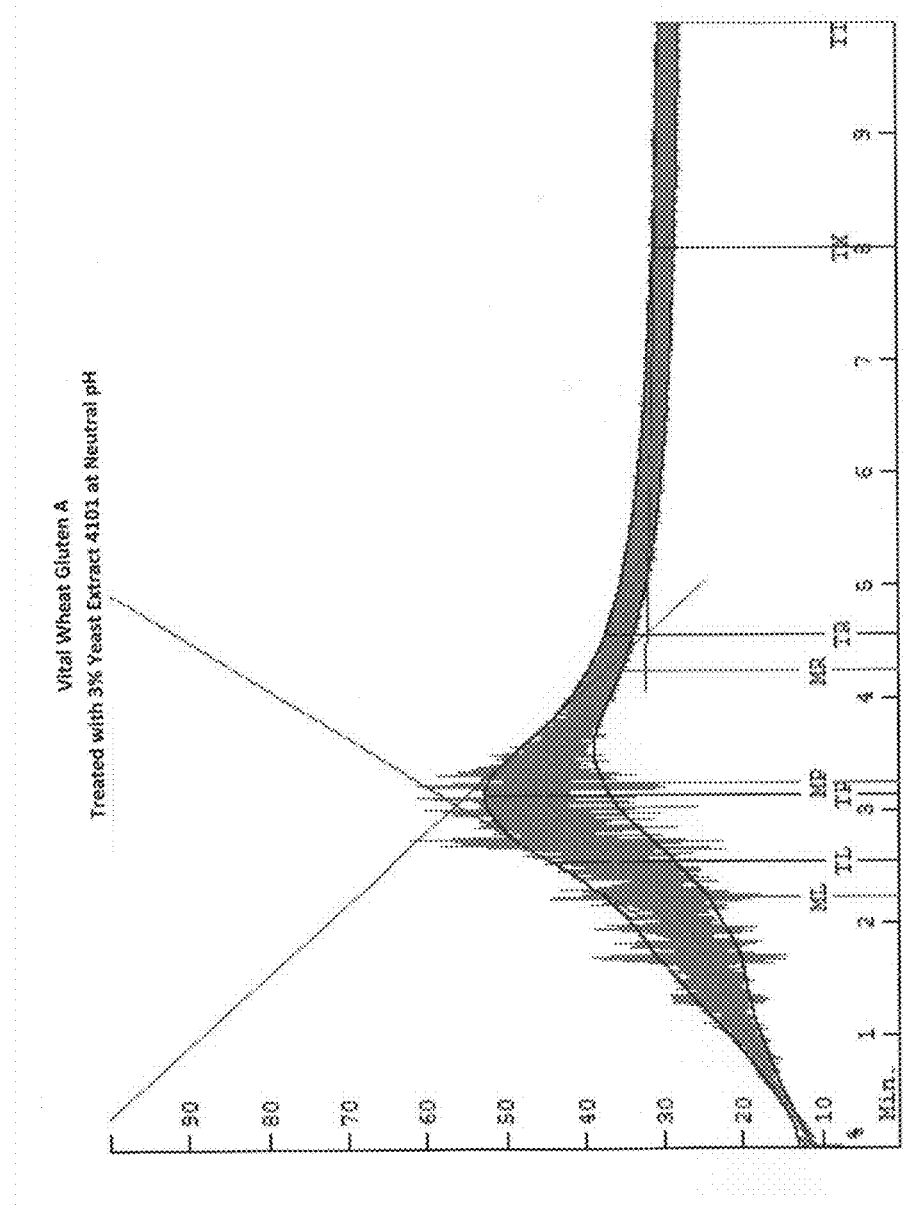
FIG. 3 is a mixograph profile at 85.7% absorption of vital wheat gluten A treated with 3% yeast extract 4101 at neutral pH.
Figure 4:
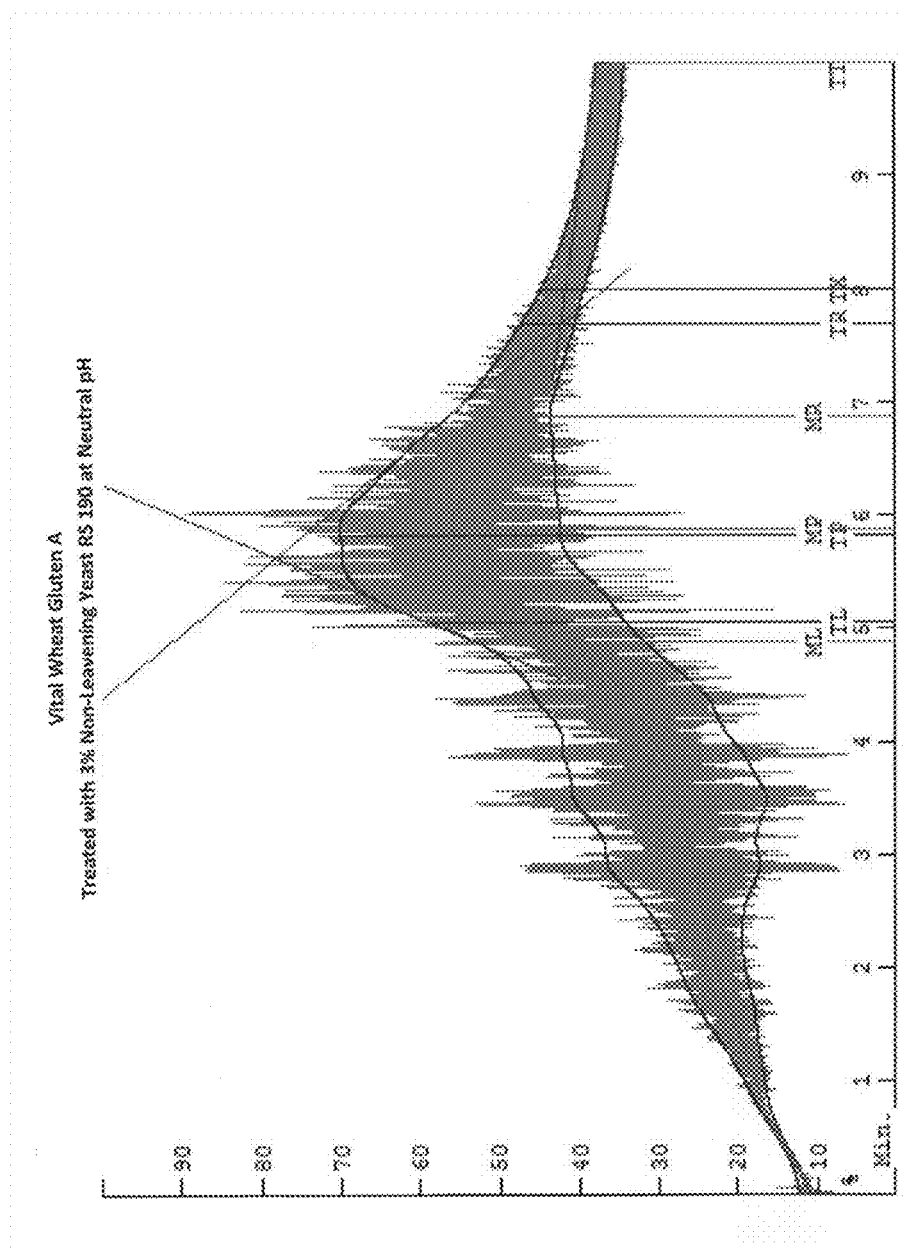
FIG. 4 is a mixograph profile at 85.7% absorption of vital wheat gluten A treated with 3% non-leavening yeast RS 190 at neutral pH.
Figure 5:
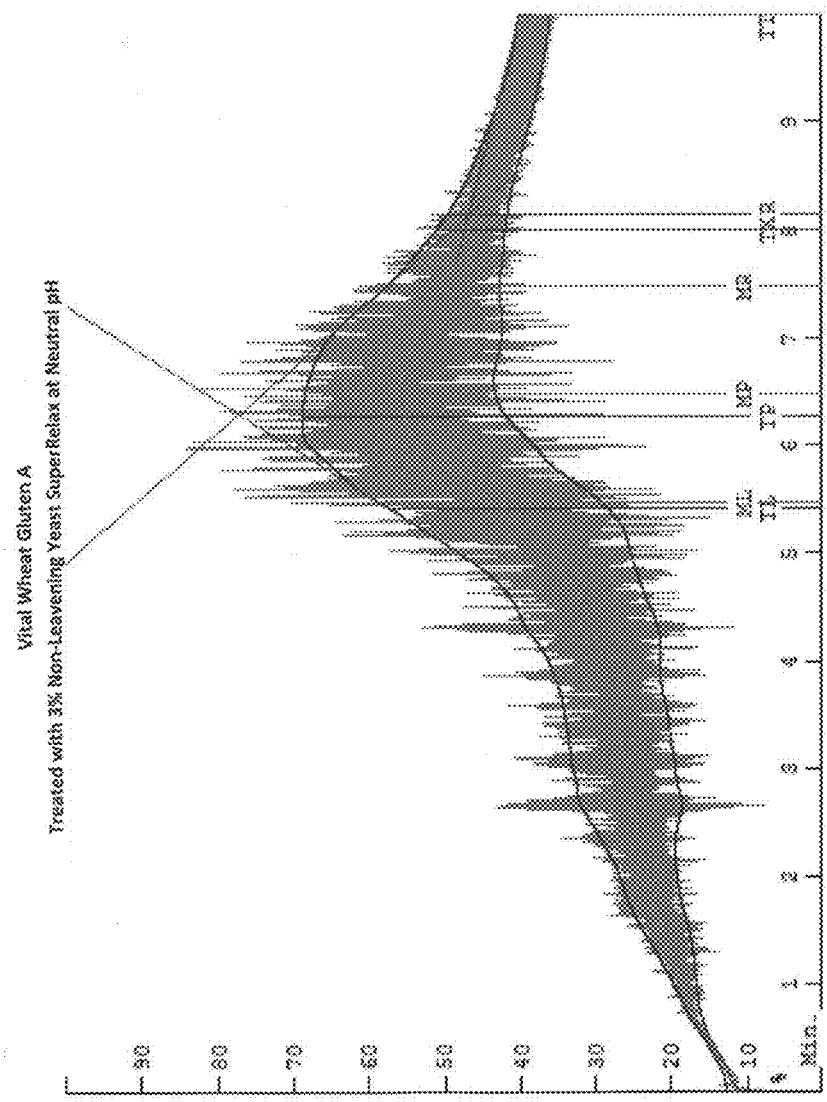
FIG. 5 is a mixograph profile at 85.7% absorption of vital wheat gluten A treated with 3% non-leavening yeast Super-Relax at neutral pH.
Figure 6:
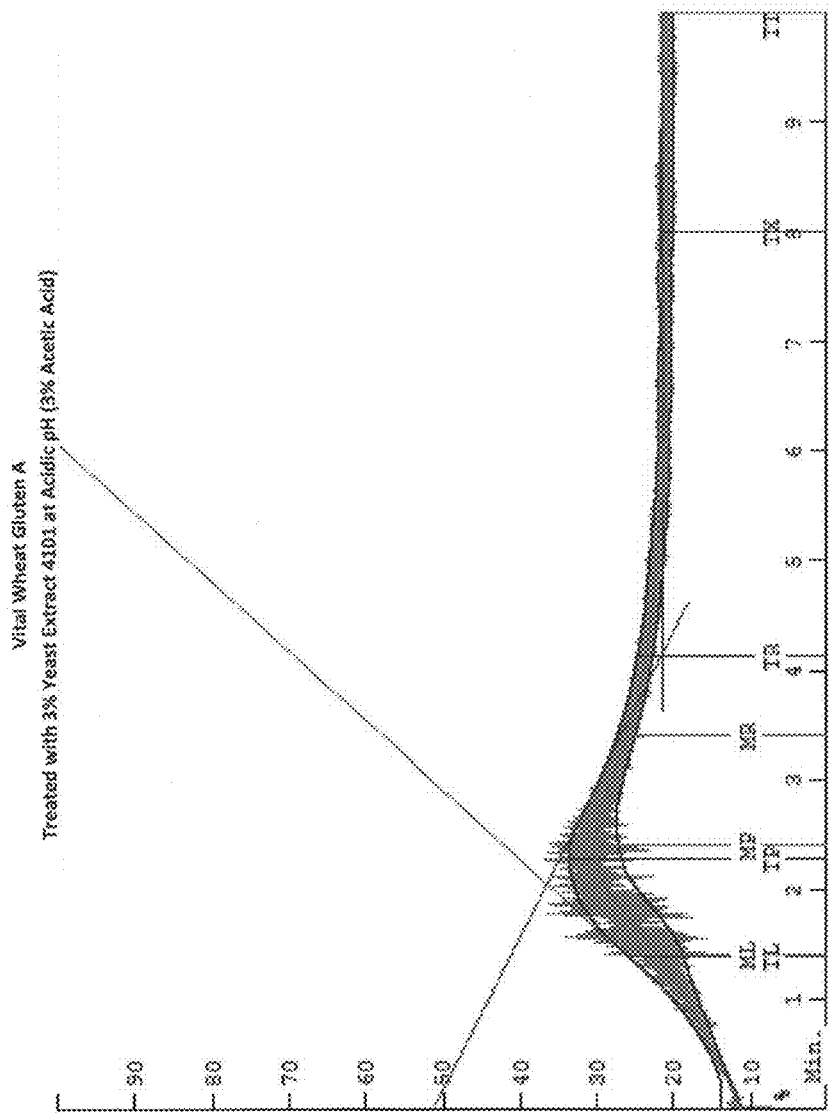
FIG. 6 is a mixograph profile at 85.7% absorption of vital wheat gluten A treated with 3% yeast extract 4101 at acidic pH.

Reaction of Vital Wheat Gluten A with 4101 under neutral or acidic pH was evaluated for the effects on mixing properties. The Mixograph data in Table 3 and the Mixograph curves (FIGS. 1 and 3 compared to FIG. 6) confirm the decline of peak time, peak height, peak width and work input upon treatment with 4101 under neutral pH conditions (pH 5.91), and a further lowering of the four mixing parameters when 4101 treatment was conducted at acidic conditions (pH 4.39).

TABLE 3

Effect on Mixograph Properties of Treating Vital Wheat Gluten A with 3% 4101 at Neutral or Acidic Conditions

| | Vital Wheat Gluten A | | |
|---|---|---|---|
| Parameters | Untreated | Treated with 3% 4101 at Neutral pH[a] | Treated with 3% 4101 at Acidic pH[b] |
| pH | 5.70 | 5.91 | 4.39 |
| Peak Time, min | 6.9 | 3.2 | 2.4 |
| Peak Height, % | 68.6 | 45.2 | 30.5 |
| Peak Width, % | 41.6 | 14.8 | 6.4 |
| Mixing Stability or Tolerance, %/min | 6.1 | 8.1 | 6.1 |
| Work Input, % Torque × min | 249.2 | 85.1 | 50.5 |

[a]Neutral pH means that there were no added acidic or alkaline chemicals during treatment with 4101
[b]With 3% acetic acid Using different types of natural acidulants to lower the pH during reaction of Vital Wheat Gluten A with SuperRelax, the pH ranged from 3.59-4.25 and the Mixograph parameters of peak time, peak height, peak width and work input generally declined whereas mixing stability or tolerance improved (Table 4). Among the five natural acidulants, tartaric acid tended to have the largest lowering effect on Mixograph parameters while citric acid has the smallest lowering effect. It appears that varying levels of extensibility of the reduced form of wheat protein can be attained depending on the type of acidulant used.

TABLE 4

Effect of Acidic pH on mixing properties of Vital Wheat Gluten A Treated with 3% SuperRelax

| | Level of Natural Acidulant to Lower pH | | | | | |
|---|---|---|---|---|---|---|
| Parameters | 0 | 3% Acetic Acid | 3% Citric Acid | 3% Lactic Acid | 3% Malic Acid | 3% Tartaric Acid |
| pH | 5.70 | 4.25 | 3.85 | 3.95 | 3.79 | 3.59 |
| Peak Time, min | 6.5 | 2.8 | 3.7 | 2.1 | 2.9 | 2.1 |
| Peak Height, % | 55.8 | 38.2 | 38.9 | 35.2 | 33.2 | 31.5 |
| Peak Width, % | 25.2 | 11.0 | 12.1 | 9.7 | 8.7 | 8.2 |
| Mixing Stability or Tolerance, %/min | 11.4 | 4.5 | 4.5 | 5.7 | 4.3 | 5.5 |
| Work Input, % Torque × min | 189.1 | 73.8 | 92.5 | 55.3 | 66.9 | 50.4 |

The mixing properties of four wheat protein samples treated with 2% 4101 at acidic conditions (pH 4.00-4.12) were determined. Compared to the Mixograph data of native wheat proteins shown on Table 1, there is again a general lowering trend of mixing parameters (Table 5). The magnitude of the effect appears to show more variability with vital wheat gluten samples than with wheat protein isolate samples. The hydrated, reduced form of wheat proteins exhibits more extensibility than the untreated, native wheat proteins.

TABLE 5

Effect on Mixing Properties of Different Sources of
Wheat Protein Treated with 2% 4101 at Acidic pH[a]

| Parameters | Source of Wheat Protein | | | |
| --- | --- | --- | --- | --- |
| | Vital Wheat Gluten B | Vital Wheat Gluten C | Wheat Protein Isolate D | Wheat Protein Isolate E |
| pH | 4.07 | 4.10 | 4.00 | 4.12 |
| Peak Time, min | 2.1 | 4.7 | 1.5 | 1.8 |
| Peak Height, % | 31.8 | 32.9 | 35.2 | 30.2 |
| Peak Width, % | 6.6 | 7.4 | 9.1 | 10.2 |
| Mixing Stability or Tolerance, %/min | 6.5 | 0.5 | 15.2 | 9.0 |
| Work Input, % torque × min | 48.2 | 113.1 | 40.2 | 41.7 |

[a]With 3% lactic acid

The Mixograph data in Table 6 using four different wheat proteins treated with 3% RS 190 at acidic conditions (pH 3.96-4.06) appears to be consistent with the data shown in Table 5 obtained from wheat proteins treated with 2% 4101 also at acidic conditions. The differential effect was again more evident with wheat gluten, specifically Vital Wheat Gluten C. A common characteristic of these RS 190-treated wheat proteins is the increased dough extensibility compared to their respective untreated, native wheat protein counterparts.

TABLE 6

Effect on Mixing Properties of Different Sources of
Wheat Protein Treated with 3% RS 190 at Acidic pH[a]

| Parameters | Source of Wheat Protein | | | |
| --- | --- | --- | --- | --- |
| | Vital Wheat Gluten B | Vital Wheat Gluten C | Wheat Protein Isolate D | Wheat Protein Isolate E |
| pH | 3.97 | 4.02 | 3.96 | 4.06 |
| Peak Time, min | 2.1 | 5.2 | 1.5 | 1.3 |
| Peak Height, % | 32.9 | 32.5 | 34.6 | 35.0 |
| Peak Width, % | 10.1 | 7.2 | 10.1 | 6.8 |
| Mixing Stability or Tolerance, %/min | 4.9 | 0.5 | 12.9 | 25.0 |
| Work Input, % torque × min | 52.2 | 130.4 | 42.7 | 39.3 |

[a]With 3% lactic acid

Citric acid tends to have a lesser lowering effect on Mixograph parameters compared to malic and tartaric acids (Table 7). Both samples of wheat protein isolates, in general, behaved similarly with respect to their mixing properties as affected by RS 190 treatment at acidic pH conditions (pH 3.60-3.96).

TABLE 7

Effect on Mixing Properties of Two Wheat Protein Isolates Treated
with 3% RS 190 at Acidic pH

| Parameters Natural Acidulant | Wheat Protein Isolate D | | | Wheat Protein Isolate E | | |
| --- | --- | --- | --- | --- | --- | --- |
| | 3% Malic Acid | 3% Citric Acid | 3% Tartaric Acid | 3% Malic Acid | 3% Citric Acid | 3% Tartaric Acid |
| pH | 3.77 | 3.83 | 3.60 | 3.89 | 3.96 | 3.69 |
| Peak Time, min | 1.8 | 3.1 | 2.3 | 2.0 | 3.6 | 2.0 |

TABLE 7-continued

Effect on Mixing Properties of Two Wheat Protein Isolates Treated
with 3% RS 190 at Acidic pH

| Parameters Natural Acidulant | Wheat Protein Isolate D | | | Wheat Protein Isolate E | | |
| --- | --- | --- | --- | --- | --- | --- |
| | 3% Malic Acid | 3% Citric Acid | 3% Tartaric Acid | 3% Malic Acid | 3% Citric Acid | 3% Tartaric Acid |
| Peak Height, % | 35.0 | 40.0 | 30.9 | 36.6 | 39.4 | 32.5 |
| Peak Width, % | 9.5 | 12.8 | 7.8 | 10.1 | 12.5 | 11.8 |
| Mixing Stability or Tolerance, %/min | 10.0 | 3.8 | 5.5 | 7.2 | 2.8 | 8.0 |
| Work Input, % torque × min | 48.8 | 82.8 | 53.2 | 58.0 | 99.4 | 51.1 |

Table 8 shows the effect on Mixograph properties of hard red winter wheat flour containing 0% (Control), 2%, or 4% of wheat gluten. Vital Wheat Gluten A tended to increase peak time, peak height and work input with the larger effect exhibited at 4% level of addition. The same trend is true for Vital Wheat Gluten B, except that, in addition, it tends to have higher peak width compared to the control wheat flour. Vital Wheat Gluten C behaved differently than the other two gluten samples. It has higher peak time and much elevated work input compared to the control wheat flour.

TABLE 8

Effect on Mixing Properties of Wheat Flour by
Adding Vital Wheat Gluten at 2% or 4% Level

| Parameters | 0% (Control) | 2% | 2% | 4% | 4% |
| --- | --- | --- | --- | --- | --- |
| | Level of Addition of Vital Wheat Gluten A | | | | |
| Absorption, % | 63 | 66 | 67 | 69 | 71 |
| Peak Time, min | 3.3 | 3.3 | 3.5 | 3.5 | 3.7 |
| Peak Height, % | 53.2 | 54.5 | 55.6 | 55.6 | 54.3 |
| Peak Width, % | 24.9 | 29.6 | 27.8 | 23.4 | 24.8 |
| Mixing Stability or Tolerance, %/min | 4.9 | 5.8 | 6.4 | 5.0 | 5.2 |
| Work Input, % torque × min | 145.3 | 143.2 | 149.5 | 151.6 | 152.0 |
| | Level of Addition of Wheat Gluten B | | | | |
| Absorption, % | 63 | 66 | 67 | 69 | 71 |
| Peak Time, min | 3.3 | 3.4 | 3.6 | 3.5 | 3.6 |
| Peak Height, % | 53.2 | 55.9 | 56.5 | 55.5 | 55.0 |
| Peak Width, % | 24.9 | 27.7 | 26.6 | 27.5 | 26.6 |
| Mixing Stability or Tolerance, %/min | 4.9 | 5.0 | 6.0 | 5.1 | 4.8 |
| Work Input, % torque × min | 145.3 | 153.6 | 159.3 | 152.6 | 150.4 |
| | Level of Addition of Vital Wheat Gluten C | | | | |
| Absorption, % | 63 | 66 | 67 | 69 | 71 |
| Peak Time, min | 3.3 | 4.0 | 4.2 | 4.7 | 4.9 |
| Peak Height, % | 53.2 | 50.3 | 50.0 | 53.8 | 53.8 |
| Peak Width, % | 24.9 | 25.6 | 22.7 | 26.2 | 22.2 |
| Mixing Stability or Tolerance, %/min | 4.9 | 2.4 | 0.6 | 1.1 | 3.3 |
| Work Input, % torque × min | 145.3 | 167.6 | 174.5 | 202.5 | 202.7 |

Table 9 shows the effects on Mixograph properties of hard red winter wheat flour containing 0% (Control), 2%, and 4% of Wheat Protein Isolate D. Isolate D tended to increase peak time, peak height and work input of wheat flour, whereas Isolate E tended to increase peak time, peak height, peak width, and work input. In addition, Isolate E improved the mixing stability or tolerance of flour. The 4% level of addition of Wheat Protein Isolate E exhibited higher work input compared to 2% level of addition.

TABLE 9

Effect on Mixing Properties of Wheat Flour by
Adding Wheat Protein Isolate at 2% or 4% Level

| Parameters | 0% (Control) | 2% | 2% | 4% | 4% |
|---|---|---|---|---|---|
| | Level of Addition of Wheat Protein Isolate D | | | | |
| Absorption, % | 63 | 66 | 67 | 69 | 71 |
| Peak Time, min | 3.3 | 3.5 | 3.6 | 3.6 | 3.7 |
| Peak Height, % | 53.2 | 55.1 | 53.5 | 55.8 | 53.4 |
| Peak Width, % | 24.9 | 23.8 | 27.3 | 23.2 | 25.0 |
| Mixing Stability or Tolerance, %/min | 4.9 | 4.4 | 5.1 | 4.3 | 5.6 |
| Work Input, % torque × min | 145.3 | 153.3 | 153.0 | 155.6 | 153.0 |
| | Level of Addition of Wheat Protein Isolate E | | | | |
| Absorption, % | 63 | 66 | 67 | 69 | 71 |
| Peak Time, min | 3.3 | 4.0 | 4.0 | 4.2 | 4.4 |
| Peak Height, % | 53.2 | 53.3 | 53.5 | 55.4 | 53.7 |
| Peak Width, % | 24.9 | 27.6 | 29.6 | 25.2 | 27.6 |
| Mixing Stability or Tolerance, %/min | 4.9 | 2.3 | 3.4 | 2.6 | 3.4 |
| Work Input, % torque × min | 145.3 | 170.1 | 171.2 | 179.8 | 186.2 |

The type and level of non-leavening yeast or yeast extract used to treat Vital Wheat Gluten A to produce a dough relaxer affected the Mixograph properties of wheat flour. For example, 2% level of addition of 3% 4101-treated wheat gluten resulted in a general decrease of peak time and work input compared to wheat flour and untreated wheat gluten. The lowering effect of both parameters was exhibited more after 3% 4101 treatment than after 2% 4101 treatment (Table 10a). At 4% level of addition, the above same effect on peak time and work input was observed except that the magnitude of decrease was more substantial (Table 10b). In contrast, a dough relaxer made using RS 190-treated wheat gluten did not have a significant effect on Mixograph properties, but a SuperRelax-treated wheat gluten relaxer caused a general decrease in peak width at 2 and 4% levels of addition. Furthermore, there is a decrease in peak height, an improvement in mixing stability or tolerance and an increase in peak time and work input at 2% level of addition of SuperRelax-treated wheat gluten.

TABLE 10a

Effect on Mixograph Properties of Wheat Flour by Adding
2% of Untreated, 4101-, RS 190- or SuperRelax-Treated Vital Wheat
Gluten A Prepared under Neutral pH Conditions

| Parameters | Wheat Flour | Vital Wheat Gluten A (2% Level) | | | | |
|---|---|---|---|---|---|---|
| | | Untreated | | 2% 4101[a] | | 3% 4101[a] |
| Absorption, % | 63 | 66 | 67 | 66 | 67 | 66 | 67 |
| Peak Time, min | 3.3 | 3.3 | 3.5 | 3.4 | 3.4 | 3.1 | 3.1 |
| Peak Height, % | 53.2 | 54.5 | 55.6 | 53.2 | 51.6 | 53.9 | 55.0 |
| Peak Width, % | 24.9 | 29.6 | 27.8 | 24.3 | 20.7 | 22.6 | 29.8 |
| Mixing Stability or Tolerance, %/min | 4.9 | 5.8 | 6.4 | 4.3 | 4.3 | 3.2 | 5.9 |
| Work Input, % Torque × min | 145.3 | 143.2 | 149.5 | 142.4 | 137.0 | 132.8 | 132.5 |

| | | | 3% RS 190[a] | | 3% SuperRelax[a] | |
|---|---|---|---|---|---|---|
| | | Untreated | | | | |
| Absorption, % | 63 | 66 | 67 | 66 | 67 | 66 | 67 |
| Peak Time, min | 3.3 | 3.3 | 3.5 | 3.5 | 3.4 | 3.6 | 3.7 |
| Peak Height, % | 53.2 | 54.5 | 55.6 | 55.8 | 53.6 | 52.7 | 51.2 |
| Peak Width, % | 24.9 | 29.6 | 27.8 | 25.4 | 30.8 | 23.4 | 22.3 |
| Mixing Stability or Tolerance, %/min | 4.9 | 5.8 | 6.4 | 4.8 | 4.7 | 2.9 | 3.2 |
| Work Input, % Torque × min | 145.3 | 143.2 | 149.5 | 153.3 | 145.4 | 151.4 | 151.8 |

[a]Prepared under neutral pH conditions (no added acidic or alkaline chemicals)

TABLE 10b

Effect on Mixograph Properties of Wheat Flour by Adding
4% of Untreated, 4101-, RS 190- or SuperRelax-Treated Vital Wheat
Gluten A Prepared under Neutral pH Conditions

| Parameters | Wheat Flour | Vital Wheat Gluten A (4% Level) | | | | |
|---|---|---|---|---|---|---|
| | | Untreated | | 2% 4101[a] | | 3% 4101[a] |
| Absorption, % | 63 | 69 | 71 | 69 | 71 | 69 | 71 |
| Peak Time, min | 3.3 | 3.5 | 3.7 | 3.1 | 3.3 | 2.8 | 3.0 |
| Peak Height, % | 53.2 | 55.6 | 54.3 | 54.5 | 52.3 | 54.5 | 54.1 |
| Peak Width, % | 24.9 | 23.4 | 24.8 | 22.7 | 21.5 | 23.7 | 21.0 |
| Mixing Stability or Tolerance, %/min | 4.9 | 5.0 | 5.2 | 5.2 | 5.1 | 3.9 | 5.6 |
| Work Input, % Torque × min | 145.3 | 151.6 | 152.0 | 129.2 | 132.4 | 116.4 | 121.2 |

| | | Untreated | | 3% RS 190 | | 3% SuperRelax[a] | |
|---|---|---|---|---|---|---|---|
| Absorption, % | 63 | 69 | 71 | 69 | 71 | 69 | 71 |
| Peak Time, min | 3.3 | 3.5 | 3.7 | 3.4 | 3.6 | 3.5 | 3.7 |
| Peak Height, % | 53.2 | 55.6 | 54.3 | 55.5 | 53.3 | 53.8 | 52.4 |
| Peak Width, % | 24.9 | 23.4 | 24.8 | 27.9 | 21.6 | 20.7 | 20.8 |
| Mixing Stability or Tolerance, %/min | 4.9 | 5.0 | 5.2 | 5.6 | 5.1 | 4.0 | 5.2 |
| Work Input, % Torque × min | 145.3 | 151.6 | 152.0 | 144.0 | 145.0 | 144.3 | 149.1 |

[a]Prepared under neutral pH conditions (no added acidic or alkaline chemicals)

Addition of 4101-treated Vital Wheat Gluten A generally decreased peak time and work input, but increased peak height of wheat flour (Table 11). Addition of 4101-treated Vital Wheat Gluten A prepared under acidic conditions generally decreased peak time, peak width and work input, but increased peak height of wheat flour. The lowering effect on peak time, peak width and work input was enhanced under acid pH conditions. Higher level of addition of 4101-treated Vital Wheat Gluten A produced a greater reduction in work input whether under neutral or acid pH conditions. The results indicate a dough relaxing effect of 4101-treated Vital Wheat Gluten A prepared under neutral or acidic pH conditions.

TABLE 11

Effect on Mixograph Properties of Wheat Flour
by Adding 4101[a]-Treated Vital Wheat Gluten A
Prepared under Neutral or Acidic Conditions

| Parameters | 0% (Control) | 2% | 2% | 4% | 4% |
|---|---|---|---|---|---|
| | Level of Addition of 4101[a]-Treated Vital Wheat Gluten A (Acidic pH[b]) | | | | |
| Absorption, % | 63 | 66 | 67 | 69 | 71 |
| Peak Time, min | 3.3 | 2.7 | 2.9 | 2.4 | 2.6 |
| Peak Height, % | 53.2 | 54.8 | 55.8 | 55.5 | 53.2 |

TABLE 11-continued

Effect on Mixograph Properties of Wheat Flour by Adding 4101[a]-Treated Vital Wheat Gluten A Prepared under Neutral or Acidic Conditions

| Parameters | 0% (Control) | 2% | 2% | 4% | 4% |
|---|---|---|---|---|---|
| Peak Width, % | 24.9 | 21.5 | 24.6 | 20.3 | 19.3 |
| Mixing Stability or Tolerance, %/min | 4.9 | 4.2 | 5.6 | 5.0 | 3.7 |
| Work Input, % torque × min | 145.3 | 115.0 | 122.8 | 103.7 | 102.4 |
| | Level of Addition of 4101[a]-Treated Vital Wheat Gluten A (Neutral pH[c]) | | | | |
| Absorption, % | 63 | 66 | 67 | 69 | 71 |
| Peak Time, min | 3.3 | 3.1 | 3.1 | 2.8 | 3.0 |
| Peak Height, % | 53.2 | 53.9 | 55.0 | 54.5 | 54.1 |
| Peak Width, % | 24.9 | 22.6 | 29.8 | 23.7 | 21.0 |
| Mixing Stability or Tolerance, %/min | 4.9 | 3.2 | 5.9 | 3.9 | 5.6 |
| Work Input, % torque × min | 145.3 | 132.8 | 132.5 | 116.4 | 121.2 |

[a]Treated with 3% 4101
[b]With 3% Acetic Acid
[c]Neutral pH means that there were no added acidic or alkaline chemicals during treatment with 4101

Addition of 4101-Treated Vital Wheat Gluten B generally decreased peak time and work input, but increased peak height of wheat flour (Table 12). With RS 190 treatment, there is a general reduction in peak time and work input, but improvement in mixing stability or tolerance. In both treatments, 4% level of addition has greater reducing effect on peak time and work input.

TABLE 12

Effect on Mixograph Properties of Wheat Flour by Adding 4101- or RS 190-Treated Vital Wheat Gluten B

| Parameters | 0% (Control) | 2% | 2% | 4% | 4% |
|---|---|---|---|---|---|
| | Level of Addition of 4101[a]-Treated Vital Wheat Gluten B (Acidic pH[c]) | | | | |
| Absorption, % | 63 | 66 | 67 | 69 | 71 |
| Peak Time, min | 3.3 | 2.9 | 2.9 | 2.6 | 2.7 |
| Peak Height, % | 53.2 | 57.0 | 53.8 | 56.2 | 54.0 |
| Peak Width, % | 24.9 | 31.1 | 20.1 | 23.8 | 19.7 |
| Mixing Stability or Tolerance, %/min | 4.9 | 5.0 | 3.2 | 4.5 | 4.6 |
| Work Input, % torque × min | 145.3 | 128.7 | 121.8 | 109.0 | 109.0 |
| | Level of Addition of RS 190[b]-Treated Vital Wheat Gluten B (Acidic pH[c]) | | | | |
| Absorption, % | 63 | 66 | 67 | 69 | 71 |
| Peak Time, min | 3.3 | 3.0 | 3.1 | 2.7 | 2.8 |
| Peak Height, % | 53.2 | 53.7 | 53.5 | 54.0 | 52.4 |
| Peak Width, % | 24.9 | 26.2 | 22.6 | 21.9 | 21.9 |
| Mixing Stability or Tolerance, %/min | 4.9 | 3.6 | 3.7 | 3.2 | 3.7 |
| Work Input, % torque × min | 145.3 | 126.8 | 131.4 | 113.4 | 113.6 |

[a]Treated with 2% 4101
[b]Treated with 3% RS 190
[c]With 3% lactic acid

Addition of Vital Wheat Gluten C treated with 2% 4101 or 3% lactic acid generally results in a decline in peak time, peak height, peak width and work input but an improvement in mixing stability or tolerance (Table 13). The magnitude of peak time and work input reduction was higher at 4% addition level compared to 2% level. With 3% RS 190 and 3% lactic acid, there is a general reduction in peak height, peak width and work input, but an improvement in mixing stability or tolerance. Addition of Vital Wheat Gluten C treated with only 3% lactic acid did not show any general trend except for an improvement of mixing stability or tolerance.

TABLE 13

Effect on Mixograph Properties of Wheat Flour by Adding 4101- or RS 190-Treated Vital Wheat Gluten C

| Parameters | 0% (Control) | 2% | 2% | 4% | 4% |
|---|---|---|---|---|---|
| | Level of Addition of 4101[a]-Treated Vital Wheat Gluten C (Acidic pH[c]) | | | | |
| Absorption, % | 63 | 66 | 67 | 69 | 71 |
| Peak Time, min | 3.3 | 3.2 | 3.1 | 2.8 | 3.0 |
| Peak Height, % | 53.2 | 53.0 | 52.7 | 52.2 | 50.5 |
| Peak Width, % | 24.9 | 21.7 | 23.4 | 20.6 | 23.7 |
| Mixing Stability or Tolerance, %/min | 4.9 | 3.7 | 3.9 | 3.8 | 3.1 |
| Work Input, % torque × min | 145.3 | 134.3 | 130.2 | 117.4 | 119.2 |
| | Level of Addition of Acidified Vital Wheat Gluten C (Acidic pH[c]) | | | | |
| Absorption, % | 63 | 66 | 67 | 69 | 71 |
| Peak Time, min | 3.3 | 3.2 | 3.4 | 3.3 | 3.6 |
| Peak Height, % | 53.2 | 53.6 | 54.1 | 51.6 | 49.8 |
| Peak Width, % | 24.9 | 28.7 | 22.6 | 23.2 | 22.8 |
| Mixing Stability or Tolerance, %/min | 4.9 | 3.7 | 3.1 | 2.8 | 2.3 |
| Work Input, % torque × min | 145.3 | 140.6 | 149.7 | 137.2 | 147.5 |
| | Level of Addition of RS 190[b]-Treated Vital Wheat Gluten C (Acidic pH[c]) | | | | |
| Absorption, % | 63 | 66 | 67 | 69 | 71 |
| Peak Time, min | 3.3 | 3.2 | 3.3 | 3.1 | 3.2 |
| Peak Height, % | 53.2 | 52.2 | 52.3 | 51.7 | 51.3 |
| Peak Width, % | 24.9 | 24.3 | 20.3 | 21.1 | 21.9 |
| Mixing Stability or Tolerance, %/min | 4.9 | 3.5 | 3.6 | 2.5 | 3.0 |
| Work Input, % torque × min | 145.3 | 137.8 | 138.0 | 129.4 | 130.3 |

[a]Treated with 2% 4101
[b]Treated with 3% RS 190
[c]With 3% lactic acid

Adding 2-4% of 4101-treated Wheat Protein Isolate E tended to reduce peak time and work input but increase peak height of wheat flour (Table 14). This signifies a dough relaxing effect of the reduced form of wheat protein. The magnitude of reduction in work input is larger at 4% level of addition. A reduction in peak time, peak width and work input was observed after adding 2-4% of RS 190-treated Wheat Protein Isolate E to wheat flour. The addition of acidified Wheat Protein Isolate E (no treatment with 4101 or RS 190) improved mixing stability or tolerance with a decline in work input, but the magnitude of the change is not as substantial when compared to addition of 4101-treated or RS 190-treated wheat protein isolate. In general, the 4% level of addition of the three wheat protein isolates has a larger lowering effect of work input of wheat flour compared to 2% level of addition.

TABLE 14

Effect on Mixograph Properties of Wheat Flour by Adding Acidified, 4101-Treated or RS 190-Treated Wheat Protein Isolate E

| Parameters | 0% (Control) | 2% | 2% | 4% | 4% |
|---|---|---|---|---|---|
| \multicolumn{6}{l}{Level of Addition of 4101$^a$-Treated Wheat Protein Isolate E (Acidic pH$^c$)} | | | | | |
| Absorption, % | 63 | 66 | 67 | 69 | 71 |
| Peak Time, min | 3.3 | 2.9 | 3.1 | 2.6 | 2.7 |
| Peak Height, % | 53.2 | 57.2 | 57.0 | 56.2 | 54.6 |
| Peak Width, % | 24.9 | 28.1 | 22.7 | 23.4 | 23.8 |
| Mixing Stability or Tolerance, %/min | 4.9 | 5.3 | 6.0 | 5.3 | 4.4 |
| Work Input, % torque × min | 145.3 | 132.1 | 138.1 | 115.1 | 114.8 |
| \multicolumn{6}{l}{Level of Addition of Acidified Wheat Protein Isolate E (Acidic pH$^c$)} | | | | | |
| Absorption, % | 63 | 66 | 67 | 69 | 71 |
| Peak Time, min | 3.3 | 3.4 | 3.3 | 3.1 | 3.2 |
| Peak Height, % | 53.2 | 53.4 | 52.8 | 53.9 | 52.5 |
| Peak Width, % | 24.9 | 25.8 | 24.7 | 20.7 | 21.4 |
| Mixing Stability or Tolerance, %/min | 4.9 | 2.9 | 3.2 | 2.1 | 3.7 |
| Work Input, % torque × min | 145.3 | 145.0 | 139.4 | 134.7 | 133.5 |
| \multicolumn{6}{l}{Level of Addition of RS 190$^b$-Treated Wheat Protein Isolate E (Acidic pH$^c$)} | | | | | |
| Absorption, % | 63 | 66 | 67 | 69 | 71 |
| Peak Time, min | 3.3 | 3.1 | 3.1 | 2.8 | 3.0 |
| Peak Height, % | 53.2 | 53.3 | 53.1 | 53.2 | 52.6 |
| Peak Width, % | 24.9 | 23.7 | 22.2 | 21.3 | 22.8 |
| Mixing Stability or Tolerance, %/min | 4.9 | 3.8 | 2.5 | 3.1 | 4.2 |
| Work Input, % torque × min | 145.3 | 134.4 | 131.8 | 119.5 | 121.9 |

$^a$Treated with 2% 4101
$^b$Treated with 3% RS 190
$^c$With 3% lactic acid

Further details regarding the above examples are set forth in an attachment hereto.

Example 10

In this example, a series of thirteen samples (ca. 10 mg) were tested to determine the ratio of polymeric (P) to monomeric (M) proteins therein. The vital wheat gluten A, yeast extract 4101, RS 190, and SuperRelax products are defined above.

In the preparation of the samples, SDS SE-HPLC buffer was employed containing 7.1 g $Na_2HPO_4$ plus 5 g SDS (sodium dodecyl sulfate) dissolved in 1 L water, followed by pH adjustment to 6.9 with HC1. Ten grams of each sample was weighed and an appropriate volume of the SDS buffer was added to obtain a 10 mg/mL solution. The solution was then mixed using a vortex mixer on setting 5 for 5 minutes, followed by sonication for 15 seconds with an output of 6 W. The sonicator probe chip was placed in the tube center at ⅓ of the distance up from the tube bottom. The sample was then centrifuged at 12,000 rpm for 10 minutes, followed by additional centrifugation at 14,000 rpm for 5 minutes. The supernatant was then filtered and placed into a HPLC vial.

The samples were then analyzed by size exclusion chromatography (SEC) using an Agilent HP 1100 HPLC with a Phenomenex Biosep-SEC-s4000, 300 mm×7.8 mm, 5 µm. Isolated bovine serum albumin, egg albumin, trypsinogen, and lysozyme purchased from Sigma Chemical were used to calibrate the instruments. The mobile phase used in the tests was acetonitrile/water (50/50) plus 0.1% Ormic acid, isocratic elution. The UV detector was a UV-Vis detector set at 210 nm. A retention time of 8 minutes was used as a cutoff for the P and M proteins. To calculate the ratio of P/M, the sum of the peak areas before 8 minutes was divided by the sum of the positive peaks between 8-13 minutes. Duplicates were averaged for each sample.

The samples and the P/M ratios are set forth in the following table.

TABLE 15

Summary of the Ratio of Polymeric (P) to Monomeric (M) Protein in 13 Samples as Determined by SEC

| Sample Code | Sample Identity | P/M Ratio | Standard Deviation |
|---|---|---|---|
| 1 | Vital Wheat Gluten A Untreated | 1.21 | 0.04 |
| 2 | Vital Wheat Gluten A Treated (Pre-Reacted) with 2% Yeast Extract 4101 at Neutral pH | 1.11 | 0.01 |
| 3 | Vital Wheat Gluten A Treated (Pre-Reacted) with 3% Yeast Extract 4101 at Neutral pH | 1.10 | 0.04 |
| 4 | Vital Wheat Gluten A Treated (Pre-Reacted) with 3% Non-Leavening Yeast RS 190 at Neutral pH | 1.11 | 0.03 |
| 5 | Vital Wheat Gluten A Treated (Pre-Reacted) with 3% Non-Leavening Yeast SuperRelax at Neutral pH | 1.16 | 0.01 |
| 6 | Vital Wheat Gluten A Treated (Pre-Reacted) with 3% Yeast Extract 4101 at Acidic pH (3% Acetic Acid) | 1.03 | 0.02 |
| 7 | Vital Wheat Gluten A Dry Blended with 2% Yeast Extract 4101 | 1.20 | 0.02 |
| 8 | Vital Wheat Gluten A Dry Blended with 3% Yeast Extract 4101 | 1.16 | 0.04 |
| 9 | Vital Wheat Gluten A Dry Blended with 3% Non-Leavening Yeast RS 190 | 1.25 | 0.03 |
| 10 | Vital Wheat Gluten A Dry Blended with 3% Non-Leavening Yeast SuperRelax | 1.18 | 0.06 |
| 11 | Yeast Extract 4101 | 0.00 | 0.00 |
| 12 | Non-Leavening Yeast RS 190 | 2.14 | 0.18 |
| 13 | Non-Leavening Yeast SuperRelax | 2.43 | 0.07 |

As can be seen in the above table, the P/M ratios were reduced for the pre-reacted products of the invention (Samples 2-6), as compared with untreated vital wheat gluten A (Sample 1). Moreover, the simple gluten/yeast extract mixtures without pre-reaction had P/M ratios very similar to that of the untreated vital wheat gluten A.

We claim:

1. A dough relaxer comprising the reaction product of a wheat product containing at least about 50% by weight gluten, a yeast product selected from the group consisting of non-leavening yeast, yeast extract, and mixtures thereof, and an acidulant in a quantity sufficient to give a reaction mixture pH of 3.59 to 4.25, wherein the dough relaxer has a ratio of polymeric to monomeric proteins that is at least 1.03 but less than 1.16, and wherein upon forming a mixture comprising 10 grams of the dough relaxer, 25 grams of native wheat starch, and 30 grams of water, the resulting mixture exhibits a work input of 39.3 to 130.4% torque-minutes as determined by Mixograph testing, wherein the work input is the integral value of the area beneath the mid-line from time zero to the peak time on a Mixograph curve.

2. The dough relaxer of claim 1, said wheat product selected from the group consisting of vital wheat gluten, wheat gluten isolates, and mixtures thereof.

3. The dough relaxer of claim 1, said dough relaxer being in particulate form.

4. The dough relaxer of claim 1, said yeast product containing from about 10-30 mg glutathione per gram of yeast product.

5. The dough relaxer of claim 1, the weight ratio of said wheat product to said yeast product being from about 10:1 to 100:1.

6. The dough relaxer of claim 5, said ratio being from 35:1 to 70:1.

7. A wheat flour-based dough comprising wheat flour and a dough relaxer in accordance with claim 1.

8. The dough of claim 7, wherein said dough relaxer is present at a level of from about 0.1-10% by weight, based upon the weight of the wheat flour in the dough taken as 100% by weight.

9. The dough of claim 8, said level being from about 0.5-8% by weight.

10. A method of preparing a dough relaxer comprising the steps of reacting a wheat product containing at least about 50% by weight gluten with a yeast product selected from the group consisting of non-leavening yeast, yeast extract, and mixtures thereof, in the presence of an acidulant and at a pH of 3.59 to 4.25, wherein said reacting step comprises heating said wheat product and said yeast product by mixing said wheat product and said yeast product with water that is heated to a temperature of from 100-140° F.

11. The method of claim 10, said wheat product selected from the group consisting of vital wheat gluten, wheat gluten isolates, and mixtures thereof.

12. The method of claim 10, said dough relaxer being in particulate form.

13. The method of claim 10, said yeast product containing from about 10-30 mg glutathione per gram of yeast product.

14. The method of claim 10, the weight ratio of said wheat product to said yeast product being from about 10:1 to 100:1.

15. The method of claim 14, said ratio being from 35:1 to 70:1.

16. The method of claim 10, said reacting step comprising the steps of forming an aqueous slurry containing said wheat product and said yeast product, and agitating the slurry to form a moist product.

17. The method of claim 16, said slurry containing from about 20-85% by weight water, from about 15-60% by weight gluten product, and from about 0.1-20% by weight yeast product, based upon the total weight of the slurry taken as 100% by weight.

18. The method of claim 16, the weight ratio of said gluten product to said yeast product being from about 10:1 to 100:1.

19. The method of claim 16, including the step of agitating said slurry for a period of from about 30 minutes-2 hours.

20. The method of claim 16, said aqueous slurry having a temperature of from 100-125° F.

21. The method of claim 16, including the step of allowing said moist product to sit in a static condition for a period of from about 30 minutes-3 hours.

22. The method of claim 21, including the steps of freezing said moist product after said period, freeze drying the frozen moist product, and grinding the freeze-dried material to create a particulate.

23. The dough relaxer of claim 1, wherein the acidulant is selected from the group consisting of acetic acid, citric acid, malic acid, lactic acid, and tartaric acid.

24. The method of claim 10, wherein the acidulant is selected from the group consisting of acetic acid, citric acid, malic acid, lactic acid, and tartaric acid.

* * * * *